Feb. 9, 1937.  D. H. STEWART  2,069,981
FOCUSING SELF ERECTING FRONT CAMERA
Filed May 12, 1936
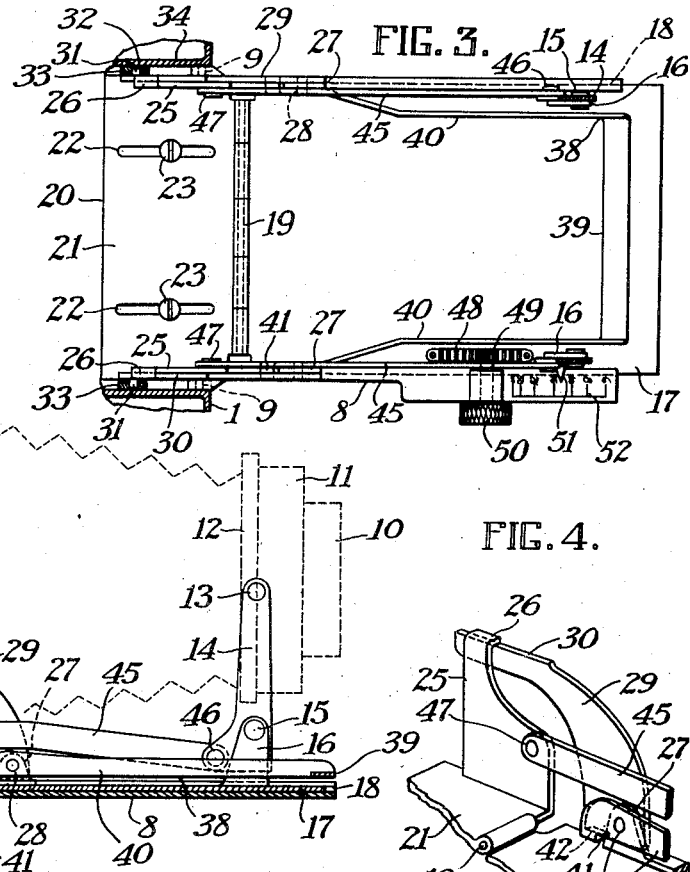
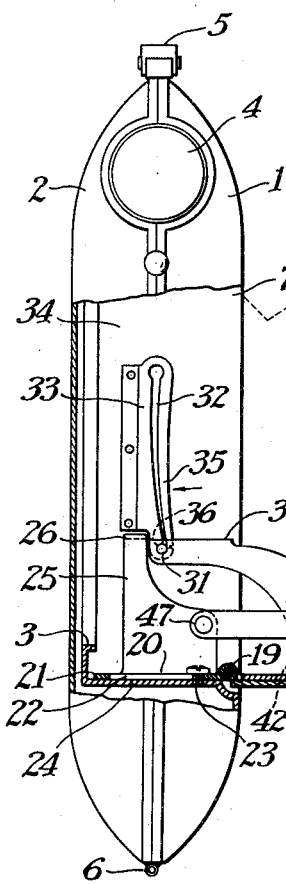
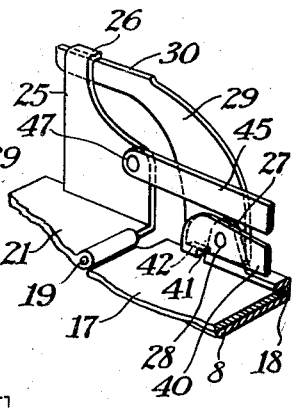
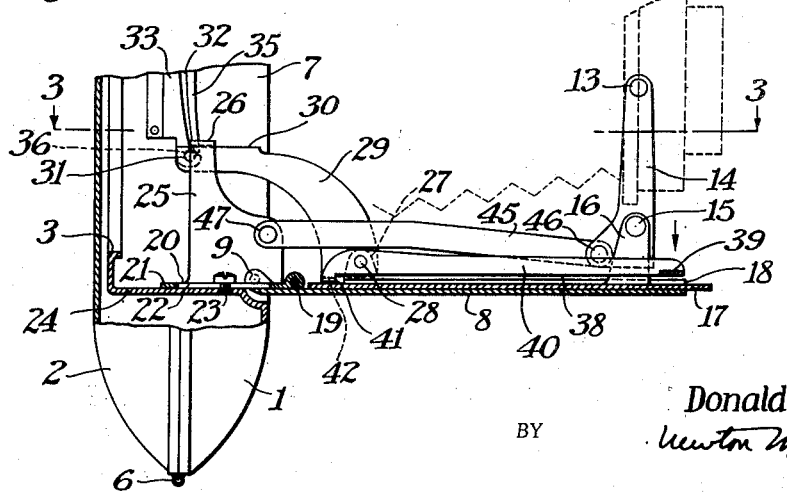
INVENTOR.
Donald H. Stewart
BY
ATTORNEY.

Patented Feb. 9, 1937

2,069,981

UNITED STATES PATENT OFFICE 2,069,981

FOCUSING SELF-ERECTING FRONT CAMERA

Donald H. Stewart, Rochester, N. Y., assignor, by mesne assignments, to Eastman Kodak Company, Jersey City, N. J., a corporation of New Jersey Application May 12, 1936, Serial No. 79,363

10 Claims. (Cl. 95—40)

This invention relates to photography and more particularly to photographic cameras of the self-erecting front type. One object of my invention is to provide a camera construction which will permit the self-erecting front mechanism of a camera to be bodily moved for focusing the camera and which will prevent the bed from being closed until the camera parts are returned to their initial or folding position. Another object of my invention is to provide a movable bed brace latch which is actuated by the focusing mechanism in such a way that the bed braces will be held against movement throughout the range of the focusing movement but will be released when the movable parts of the camera have been returned to their initial position. Another object of my invention is to provide a camera bed construction in which the bed braces are provided with a surface adapted to be engaged by the ends of a yoke when the camera front is moved from an infinity position, and other objects will appear from the following specification, the novel features being particularly pointed out in the claims at the end thereof.

It has been generally customary to make cameras of the self-erecting front type with the front and lens board in a rigid or fixed position and move either the camera objective as a whole or an element of a camera objective for focusing. One of the reasons for this is that if the camera front as a whole is moved to and from the camera body for focusing, the parts of the self-erecting front mechanism must likewise be moved, and if an attempt is made to close a camera when the parts are improperly positioned, damage is liable to result. However, it is desirable to move the lens board of a camera for focusing because with wide apertured objectives the corrections can be very readily spoiled by altering one lens element for focusing, and since the depth of field is comparatively slight, if the objective is mounted in a focusing mount, this must be extremely well made to prevent slight movement of the objective relative to the camera body.

Coming now to my invention wherein like reference characters denote like parts throughout:

Fig. 1 is a side elevation, partially in section, of a camera constructed in accordance with and embodying a preferred form of my invention.

Fig. 2 is a fragmentary section view, partially in elevation, showing parts of the camera shown in Fig. 1 in a different position, or in a position in which the objective may be focused on an object closer than infinity.

Fig. 3 is a section taken on line 3—3 of Fig. 1, parts of the camera being broken away, and Fig. 4 is an enlarged fragmentary perspective view showing the bed brace latch in an operative position.

In the embodiment of my invention shown in the drawing the camera may consist of a body portion 1 having the usual removable back 2 and being provided with an exposure aperture 3. A winding knob 4 is for moving film across the exposure frame. The usual type of handle 5 may be provided, and if desired the camera back may be hinged at 6 to the body portion 1.

There is an opening 7 in the front of the camera body which may be closed by the bed 8, which, as best shown in Fig. 2, is hinged at 9 to the camera body so that it may swing to and from the open position shown in the drawing.

The camera objective may be carried in suitable lens cells, one of which 10 is shown in Fig. 1, this cell being supported by a shutter 11 carried by the lens board 12. This lens board is pivotally supported at 13 by arms 14, pivoted at 15 to supporting brackets 16, these brackets being carried by a plate 17 slidable in the tracks 18 in the camera bed 8.

The plate 17 carries a hinge 19 to which there is attached a sliding yoke 20. This yoke consists of a base plate 21 slotted at 22 to receive the studs 23 upon which this plate may slide on the inside wall 24 of the camera body. A pair of arms 25 extend upwardly from the ends of the base plate 21 and include folded-over flanges 26.

The camera bed 8 is provided with a pair of upstanding brackets 27 carrying pivots 28 for supporting the bed braces 29, these bed braces having flat surfaces 30 and being provided with studs 31 adapted to slide in the slots 32 carried by the brackets 33 supported on the side walls 34 of the camera body. One end of the slot 32 is provided with a resilient spring member 35 which normally tends to close the slot 32 and to thrust the stud 31 into engagement with the notch 36 to hold the bed braces 29 in an operative position, in which the camera front may be held erect.

In order to release the studs 31 from the notches 36, I provide a yoke member 38 having a bar 39 extending transversely across the front of the camera bed as indicated in Fig. 3, and having a pair of side arms 40 extending rearwardly, these arms being pivotally attached on the studs 28 which support the bed braces.

The extreme ends of the arms 40 are provided with flanges 41 which engage the undersides of the flat surfaces 42 on the bed braces 29.

In order to release the bed braces for folding the camera, the bar 39 may be pressed downwardly, thus causing the flanges 41 to move upwardly and swinging the bed braces in the direction shown by the arrow in Fig. 1 about their pivots 28. This causes the pins 31 to press the springs 35 outwardly and permits the pins 31 to slide upwardly through the slots 32 as the camera bed 8 is moved to close the opening 7 in the front of the camera.

The braces 14 may be held in an erect position by means of side arms 45 which are pivoted at 46 to the ends of the braces 14 and are pivoted at 47 to the arms 25 of the yoke 20. When the camera bed is lowered, the side arms 45 cause the members 14 to turn about their pivots 15 and position the lens board 12 in an operative or picture-taking position.

In order to focus the camera, the plate 17, which, as before explained, slides in the tracks 18 of the camera bed 8, may be moved by means of the rack 48 which is attached to the plate and a pinion 49 which may be turned by the knurled focusing member 50. When this knurled member is turned to move the plate 17 outwardly, so that a pointer 51 indicates the proper focal distance on a scale 52, the yoke 20, because of its hinged connection 19 to the plate 18, also moves, this movement being permitted by the slots 22 which slide upon the studs 23.

When the camera is first opened and the objective is in its infinity position, the parts are in the position shown in Fig. 1. It should be noted from this figure that the flanges 26 of the arms 25 just clear the extreme ends of the straight edges 30 on the upper sides of the bed braces 29. Consequently, when the parts are in this position, the camera may be readily opened or closed, since the hinge pintles 9 and 19 are in axial alinement and no damage can result by moving the bed 8 about its hinge.

However, just as soon as the knurled nut 50 is turned to focus the camera, the flanges 26, as shown in Fig. 2, ride over the straight edges 30 of the bed braces 29 and definitely lock these braces with the pins 31 in engagement with the locking notches 36. With the parts in this position, if an attempt is made to press down upon the release lever 39, the bed braces 29 cannot be moved. Consequently, an operator's attention is drawn to the fact that the parts are not in a proper position to fold. Damage to the camera is definitely prevented, because the camera bed cannot be made to fold as long as the bed braces are latched.

By returning the pointer 51 back to its infinity position, the slidable plate 17 will move toward the camera body until the hinges 19 and 9 are again in axial alinement and the flanges 26 are again in the position shown in Fig. 1, in which the bed braces are released for folding.

It should be noted that as the camera is focused, the objective 10 and shutter 11 move outwardly while the releasing lever stays in its fixed position. Thus the releasing lever is rendered less accessible as the camera is focused. However, since the release lever 39 can only be used to release the bed braces 29 when the camera parts are in the position shown in Fig. 1, this is immaterial and, in fact, may even be beneficial to the extent that an operator will be less liable to try to release the bed braces until the camera parts are properly positioned.

The operation of this camera is extremely simple. The camera bed 8 is swung down upon its hinges 9 to open the camera, and during this opening movement, the side arms 45, through their pivotal connections 46 with the lens board supporting arms 14, swing the parts into an operative position as indicated in Fig. 1. This position is customarily such that the objective will be focused on infinity. To focus on closer objects, the knurled wheel 50 is turned, causing the pinion 49 to move rack 48, this rack being fixedly attached to the slide 17 which carries the self-erecting front mechanism and with it the camera objective and lens board. Just as soon as the focusing movement starts, the bed braces are definitely latched by means of the flanges 26 engaging the flat surfaces 30 of the bed braces 29, since the yoke 20 must slide out with the plate 18 being hingedly attached thereto at 19. Any attempt to release the self-erecting front mechanism for folding the camera will fail until the bed braces are again unlatched by turning the knurled head 50 until the hinges 9 and 19 are in alinement.

While I have described a preferred embodiment of my invention, it is obvious that various departures can be made therefrom, and I consider as within the scope of my invention all such forms as may come within the terms of the appended claims.

What I claim and desire to secure by Letters Patent of the United States is:

1. In a folding camera, the combination with a camera body, of a bed hinged thereto, braces pivotally attached to the bed and slidably attached to the camera body and adapted to support the bed in an operative position, the slidable connection between the braces and camera body including a pin on one part adapted to engage a hooklike edge of a slot on the other part, an objective movably carried by the camera bed for focusing the camera, a slidable bed brace latch carried by the camera body and coupled to the movable objective for holding the bed braces against movement except when the objective is in a predetermined position at which time the bed braces are released and may be folded.

2. In a folding camera, the combination with a camera body, of a bed hinged thereto, braces pivotally attached to the bed and slidably attached to the camera body and adapted to support the bed in an operative position, the slidable connection between the braces and camera bed including a pin on one part adapted to engage a hooklike edge of a slot on the other part, an objective, self-erecting front mechanism carried by the camera and bed and supporting said objective, means for moving the objective for focusing, a bed brace latch movably mounted on the camera and coupled with the focusing mechanism, said coupling being adapted to release the bed brace latch when the focusing mechanism is in a predetermined position.

3. In a folding camera, the combination with a camera body of a bed hinged thereto, braces pivotally attached to the bed and slidably attached to the camera body and adapted to support the bed in an operative position, the slidable connection between the braces and camera bed including a pin on one part adapted to engage a hooklike edge of a slot on the other part, an objective, self-erecting front mechanism carried by the camera and bed and supporting said objective, means for moving the objective for focusing, a bed brace latch comprising a member mounted to slide to and from engagement with the bed braces in which movement of the braces is prevented, a coupling between the slidable member and the focusing mechanism adapted to move the bed brace latch to a brace releasing position when the focusing mechanism is in a predetermined position.

4. In a folding camera, the combination with a camera body, of a bed hinged thereto, braces pivotally attached to the bed and slidably attached to the camera body and adapted to support the bed in an operative position, the slidable connection between the braces and camera bed including a pin on one part adapted to engage a hook-like edge of a slot on the other part, an objective, self-erecting front mechanism carried by the camera and bed and supporting said objective, means for moving the objective for focusing, a bed brace latch movably mounted on the camera and coupled with the focusing mechanism, said coupling moving the bed brace latch throughout the range of focusing movement of the focusing mechanism, the bed latch being adapted to release the bed braces for folding in one position only.

5. In a folding camera, the combination with a camera body, of a bed hinged thereto, braces supporting the bed pivotally attached thereto and having a sliding engagement with the body, self-erecting front mechanism slidably carried by the bed and adapted to be moved thereon for focusing, a bed brace latch movably carried by the camera body and coupled with the slidably carried mechanism adapted to engage and hold said bed braces against movement, throughout the major portion of the focusing movement of said self-erecting front mechanism, and being adapted to be moved from said latching engagement only when said self-erecting front mechanism is moved to a predetermined position in which the camera may be folded without damage to the mechanism.

6. In a folding camera, the combination with a camera body, of a bed hinged thereto, braces supporting the bed pivotally attached thereto and having a sliding engagement with the body, self-erecting front mechanism slidably carried by the bed and adapted to be moved thereon for focusing, a bed brace latch movably carried by the camera body and coupled with the slidably carried mechanism adapted to engage and hold said bed braces against movement, means on the camera bed for releasing said bed braces when said bed brace latch is out of operative relationship with said bed braces, and means determined by the position of the slidable self-erecting front mechanism for positioning the bed brace latch out of operative relationship with the bed braces whereby the bed brace release may be operated to fold the camera.

7. In a folding camera, the combination with a camera body, of a bed hinged thereto, braces pivotally attached to the bed and slidably attached to the body, said braces each including a straight edge parallel to the camera bed when open, a bed brace latch including a slidably mounted member including lugs adapted to slidably engage the straight edges of the bed braces throughout the greater part of the movement of the bed latch thus preventing movement of the bed braces.

8. In a folding camera, the combination with a camera body, of a bed hinged thereto, braces pivotally attached to the bed and slidably attached to the body, said braces each including a straight edge parallel to the camera bed when open, a bed brace latch including a slidably mounted member including lugs adapted to slidably engage the straight edges of the bed braces throughout the greater part of the movement of the bed latch thus preventing movement of the bed braces, said bed latch being also adapted to move into a position in which the lugs lie out of engagement with said bed braces.

9. In a folding camera, the combination with a camera body, of a bed hinged thereto, braces pivotally attached to the bed and slidably attached to the body, said braces each including a straight edge parallel to the camera bed when open, a bed brace latch including a slidably mounted U-shaped member, the bottom of which is adapted to move on the camera body and the arms of which are adapted to move adjacent the bed braces, each arm including a bent lug adapted to slidably engage the straight edges of the bed braces to hold them against movement, said bed brace latch also having a position in which said lugs slide off the straight edges permitting the braces to move for closing the camera.

10. In a folding camera, the combination with a camera body, of a bed hinged thereto, braces pivotally carried by the bed and slidably supported by the camera body for supporting said bed, a slide movably supported by the bed, self-erecting front mechanism carried at least in part by the bed slide adapted to be moved for focusing, a front release carried by the camera bed for releasing the bed braces, and a bed brace latch carried by the camera body and controlled by the bed slide for permitting the bed braces to be released only when the slide is in a predetermined position.

DONALD H. STEWART.